_United States Patent Office_ 2,760,856
Patented Aug. 28, 1956

2,760,856

METHOD FOR PRODUCING LOW SULPHUR BLAST FURNACE IRON

Dennis J. Carney, Chicago, Ill., assignor to United States Steel Corporation, a corporation of New Jersey No Drawing. Application February 9, 1953, Serial No. 336,001

6 Claims. (Cl. 75—41)

The present invention relates to a process for producing low sulphur blast furnace iron and more particularly to a process for desulphurizing blast furnace iron in the blast furnace.

In normal blast furnace operation, the burden material, which is charged into the top of the furnace, is largely converted into molten slag and iron by a high temperature melting and reduction process which results mainly from the heated air blast introduced into the furnace through the tuyeres and the coke contained in the burden. The molten iron formed accumulates in progressively increasing amounts in the bottom of the hearth zone of the furnace and the molten slag formed floats on the surface of the molten iron below tuyere level. At periodic intervals, approximately every six hours, when a sufficient quantity of the molten iron has accumulated, the furnace is tapped and the slag and iron are withdrawn from the furnace. This periodic removal of the slag and iron is termed "casting" and the iron removed during a casting is identified as a "cast." The molten iron of the cast is withdrawn from the furnace into ladles for subsequent temporary storage in the molten state or pouring into pigs. In some instances, due to the nature of the burden, an excessive amount of slag is formed in the furnace. This excessive slag is withdrawn from the hearth of the furnace some time prior to the cast.

Prior to my invention, normal blast furnace iron usually contained considerably more sulphur than the maximum amount that could be permitted in finished steel. The high sulphur content of blast furnace iron presented a serious problem in steel refinement processes and has resulted in increased steel production costs.

As the materials making up the burden of the blast furnace, principally iron ore, limestone and coke, are transformed into slag and iron, the slag formed acts upon the iron to remove sulphur therefrom the principal reaction being: $FeS+CaO+C=CaS+Fe+CO$. This reaction takes place mainly as the molten iron formed in the higher zones of the furnace diffuses through the slag to the hearth bottom. It is well known to those versed in the art that when a slag having the same composition as blast furnace slag and molten iron are held together in the laboratory at temperatures ranging from 2600 to 3000 degrees F., normal blast furnace operating temperature, until a chemical equilibrium is reached, the desulphurization ratio of sulphur in the slag to sulphur in the iron is much higher than that obtained in a conventional production blast furnace. In other words, normal blast furnace slag is capable of absorbing more of the sulphur from the iron than it usually does under normal operating conditions in a blast furnace.

It is, accordingly, an object of my invention to provide a method of obtaining improved desulphurization of blast furnace iron within the blast furnace itself.

A further object of my invention is to provide a method of obtaining a low sulphur blast furnace iron by conditioning the blast furnace slag within the furnace so as to increase the desulphurizing capability of the slag.

The method of my invention consists of adding a powerful deoxidizer, such as aluminum, calcium carbide, titanium, zirconium or other deoxidizers of this class well known in the art, to the blast furnace at or below the tuyere level and at specific times in relation to the time of casting.

When the deoxidizer is added to the furnace, precautions must be taken to prevent its oxidation by the oxidizing gases in the vicinity of the tuyere zone before it can accomplish its purpose of deoxidizing the slag within the furnace. One of the methods I have found successful for accomplishing this is to form the deoxidizer in the shape of solid bars approximately 1¼ inches in diameter and insert the bars through the peep sight hole in the tuyeres. The relatively large diameter solid bars are used because they can be pushed into the coke column in the furnace where they melt and run down into the furnace before the majority of the deoxidizer has been oxidized by the gases near the tuyere zone. I have found this method successful with the furnace blast on or off. Since the addition may be made in this manner without the necessity of abating the furnace blast, no production time is lost while the operation is carried on. The bars of deoxidizers may be pushed through the tuyeres either by a suitable machine or manually as desired. I have found it preferable to make the additions simultaneously through three tuyeres equally spaced around the furnace so that the deoxidizer may be more or less uniformly distributed. The deoxidizers may be prepared in other forms for inserting through the tuyeres such as making up the deoxidizer to be used in "shot" form, filling a thin wall steel pipe with the shot, closing the ends of the pipe and inserting the filled pipes into the furnace in the manner described above for inserting the bars. The deoxidizer in shot form may also be blown through the tuyeres with the blast. The deoxidizers may also be added below the tuyere level by providing trap doors in the furnace wall. One or more of several different deoxidizers may be used to make up a single addition if desired.

The desulphurization reaction

$$(FeS+CaO+C=CaS+Fe+CO)$$

requires both mixing of the slag and iron and sufficient time for the reaction to occur, thus the timing of the additions of the deoxidizers to the furnace is important. The first addition should be made within a half hour after the completion of a cast. In this manner, the slag and iron remaining in the furnace are deoxidized and iron which is subsequently formed must then pass through the deoxidized layer of slag and mix with the deoxidized iron on the bottom of the hearth zone as the production process goes on. The slow passage of the subsequently formed iron through the deoxidized slag layer allows the desulphurization reaction to proceed at a satisfactory rate towards chemical equilibrium. If the addition of the deoxidizer is made after a substantial amount of molten iron has accumulated, the addition would be mostly ineffective since only a relatively small upper surface of the iron would be acted upon by the conditioned slag.

In instances where an excessive amount of slag is formed, it is necessary to remove some of the slag prior to casting. The excessive slag is usually removed approximately three hours prior to casting. Where this condition exists, I have found it preferable to add the deoxidizer in two portions, approximately one-half of the total amount to be added within a half hour after the previous cast and one-half after the slag removal.

The amount of deoxidizer to be added depends on the nature of the slag formed in the furnace and the nature of the slag, in turn, depends on the quality of the burden materials. I have found that the amount of deoxidizer addition necessary to obtain a low sulphur iron, that is having a sulphur content below .05%, ranges from one-quarter pound to five pounds of deoxidizer per ton of iron capacity of the hearth zone of the furnace with approximately two pounds of deoxidizer per ton of iron capacity being the average. Thus, under average conditions, low sulphur iron is produced if approximately two pounds of powerful deoxidizer per ton of iron capacity is added within one-half hour after each cast. If a slag-off is required between casts, under average conditions, one pound of deoxidizer per ton of iron capacity is added after casting and one pound per ton is added after the slag-off.

As illustrations of the results obtained by use of the method of my invention, there are given the following specific examples, which are illustrative only, all percentages being given by weight:

EXAMPLE I

| Cast Time | Deoxidizer Addition Substance and Lbs. | Percent S in Iron Cast | Weight of Cast Tons |
|---|---|---|---|
| Date "A": | | | |
| 1:00 a. m. | 0 | .087 | 223 |
| 7:00 a. m. | 0 | .077 | 266 |
| 1:00 p. m. | 0 | .051 | 281 |
| 7:00 p. m. | 450—Al  (1) | .028 | 236 |

EXAMPLE II

| Date "B": | | | |
|---|---|---|---|
| 7:00 a. m. | 0 | .051 | |
| 1:00 p. m. | 0 | .050 | 372 |
| 7:00 p. m. | 270—Al  (2) | .042 | 314 |

EXAMPLE III

| Date "C": | | | |
|---|---|---|---|
| 1:00 a. m. | 0 | .053 | 336 |
| 7:00 a. m. | 0 | .059 | 289 |
| 1:00 p. m. | 500—CaC$_2$  (3) | .038 | 249 |

EXAMPLE IV

| Date "D": | | | |
|---|---|---|---|
| 1:00 a. m. | 0 | .056 | 287 |
| 7:00 a. m. | 0 | .053 | 265 |
| 1:00 p. m. | 500—CaC$_2$  (4) | .040 | 290 |

EXAMPLE V

| Date "E": | | | |
|---|---|---|---|
| 8:00 a. m. | 0 | .037 | 249 |
| 2:00 p. m. | 0 | .051 | 230 |
| 8:00 p. m. | 2,000—18% FeTi  (5) | .027 | 221 |

(1) Addition made 1:20 p. m.—Date "A".
(2) Addition made 1:20 p. m.—Date "B".
(3) Addition made—7:20 a. m.—Date "C".
(4) Addition made 7:20 a. m.—Date "D".
(5) Addition made 2:20 p. m.—Date "E".

While several embodiments of my invention have been shown and described, it will be apparent that other adaptations and modifications may be made without departing from the scope of the following claims.

I claim:

1. The method of producing blast furnace iron having a low sulphur content which comprises the steps of operating a blast furnace to maintain a bath of molten slag in the hearth zone thereof through which molten iron produced in the higher zones of the furnace passes and accumulates on the bottom of the hearth zone; removing said iron from said hearth zone at periodic intervals; and maintaining the slag in a highly deoxidized condition by introducing into the slag in said hearth zone, at intervals not more than about one-half hour after each of said periodic removals of molten iron from said hearth zone, a deoxidizer capable of deoxidizing said slag to render the slag more efficient as a desulphurizer of the molten iron subsequently passing through the slag.

2. The method of producing blast furnace iron as defined by claim 1 characterized by said deoxidizer being from the group consisting of aluminum, calcium carbide, titanium and zirconium.

3. The method of producing blast furnace iron as defined by claim 2 characterized by said deoxidizer being added in an amount between one quarter and five pounds per ton of iron capacity of said hearth zone.

4. The method of producing blast furnace iron having a low sulphur content which comprises the steps of operating a blast furnace to maintain a bath of molten slag in the hearth zone thereof through which molten iron produced in the higher zones of the furnace passes and accumulates on the bottom of the hearth zone; removing a portion of said slag and said iron from said hearth zone at periodic intervals; and maintaining the slag in a highly deoxidized condition by introducing into the slag in said hearth zone, at intervals not more than about one-half hour after each of said periodic removals of slag or iron from said hearth zone, a deoxidizer capable of deoxidizing said slag to render the slag more efficient as a desulphurizer of the molten iron subsequently passing through the slag.

5. The method of producing blast furnace iron as defined by claim 4 characterized by said deoxidizer being from the group consisting of aluminum, calcium carbide, titanium and zirconium.

6. The method of producing blast furnace iron as defined by claim 5 characterized by said deoxidizer being added in an amount between one quarter and five pounds per ton of iron capacity of said hearth zone.

References Cited in the file of this patent

UNITED STATES PATENTS

| 1,535,109 | Davies | Apr. 28, 1925 |
| 2,149,480 | Paschke | Mar. 7, 1939 |
| 2,290,961 | Heuer | July 28, 1942 |
| 2,706,152 | Derge et al. | Apr. 12, 1955 |